Oct. 6, 1964   W. W. WAINWRIGHT ETAL   3,152,252
X-RAY FILMS AND THE LIKE
Filed March 20, 1964   2 Sheets-Sheet 2

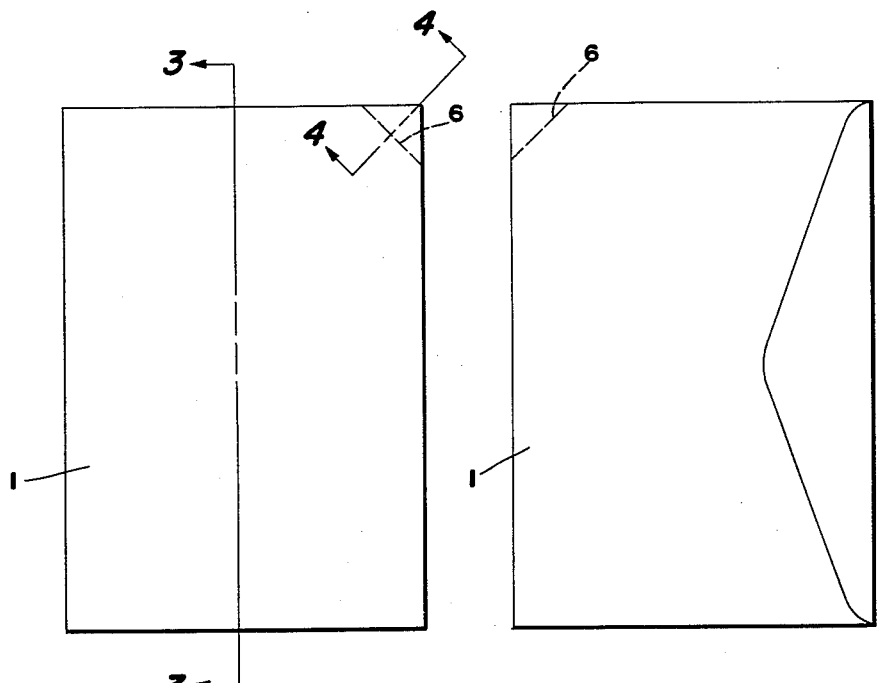
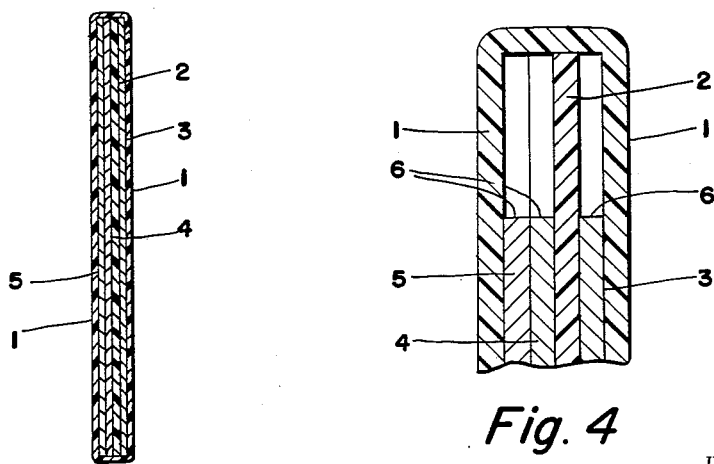

INVENTORS
WILLIAM W. WAINWRIGHT
BY ARTHUR T. CAPE

ATTORNEYS

United States Patent Office 3,152,252
Patented Oct. 6, 1964

3,152,252
X-RAY FILMS AND THE LIKE
William W. Wainwright, Inglewood, and Arthur T. Cape, Monterey, Calif., assignors to Powder Melting Corporation, Monterey, Calif., a corporation of California
Filed Mar. 20, 1964, Ser. No. 353,561
5 Claims. (Cl. 250—68)

This invention relates generally to X-ray films and the like.

Dental X-ray films, as for example, the Kodak Radiatized Safety Film, usually comprises a package or packet consisting of the film proper, sheets of black paper on each side of the film to prevent fogging of the film by light, a lead shield adjacent one of the black paper sheets, and a paper envelope enclosing this packet.

In the development of such films, the paper envelope must be torn open, in a dark room, to expose the contents of the envelope, the lead shield dropped, along with the black paper sheets, and the film clipped to a rack and then immersed in a developer solution and fixing agent. The difficulties inherent in these steps, particularly the difficulty of handling the packet in a dark room, the removal of the lead shield and black paper without marring the film, the handling or manipulating of the film, and the messiness involved in handling of the film in solutions in a dark room, will be readily apparent. These difficulties, moreover, frequently lead to underdevelopment of the film, requiring longer X-ray exposures.

The present invention has, as its primary object, the provision of an X-ray film package or packet, which is of such construction or form, as to obviate all of the difficulties and disadvantages which have been described above, and through the use of which X-ray films may be developed quickly and easily, without the use of a dark room, and by personnel which need not be highly skilled.

In accordance with one form or phase of the invention, we enclose the film, shield and black paper in an envelope or wrapper which is made of a water-soluble material, preferably polyvinyl alcohol.

In the use of such a packet, the packet, after exposure of the film, is immersed in its entirety in water, to thereby completely dissolve the polyvinyl alcohol envelope or wrapper. For this purpose, the packets may be secured to clips, which are mounted on a rack, the clips engaging only one corner of the envelope or wrapper and one corner of the film, the corresponding corners of the black paper sheets and the lead shield being removed, so as not to be gripped or clamped by the clips. Alternatively, the clips may engage a portion or area of the envelope or wrapper at any point along one of the peripheral or marginal edges of the film, the corresponding portions or areas of the black paper sheets and the lead shield being removed so as not to be gripped or clamped by the clips.

Such packets are disclosed in the accompanying drawings, in which—

FIG. 1 is a front elevational view of a packet in which the corners of the black paper sheets and the lead shield are removed;

FIG. 2 is a rear elevational view of the packet;

FIG. 3 is a cross-sectional view, on an enlarged scale, taken on the line 3—3 of FIG. 1;

FIG. 4 is a fragmentary cross-sectional view, on an enlarged scale, taken on the line 4—4 of FIG. 1;

Figures 5, 6:
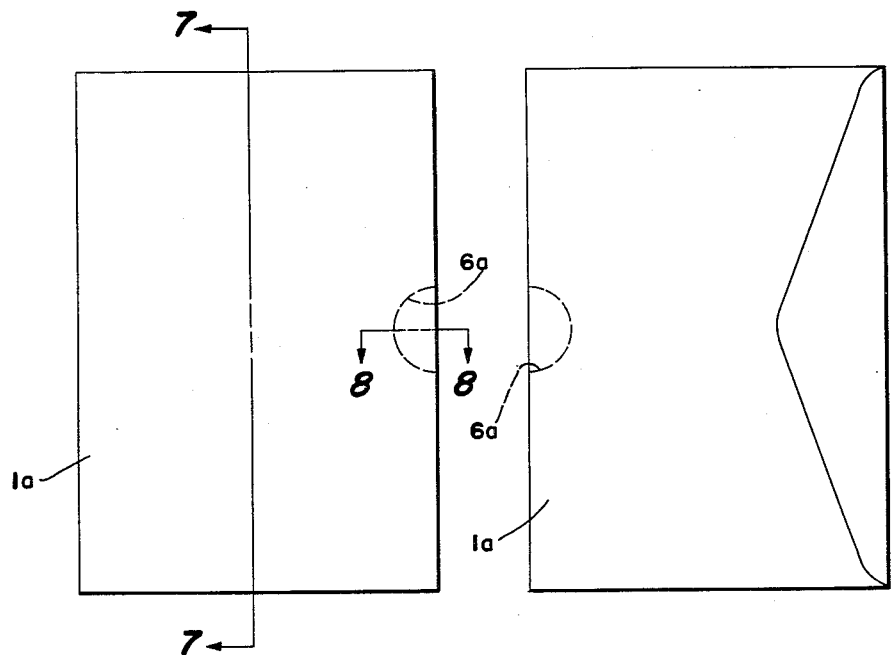
FIG. 5 is a view similar to FIG. 1, but showing a packet in which portions or areas of the black paper sheets and the lead shield along one of the peripheral or marginal edges of the packet are removed.
FIG. 6 is a rear elevational view of the packet of FIG. 5.

Referring more particularly to FIGS. 1 to 4 inclusive of the drawings, reference numeral 1 designates the polyvinyl alcohol envelope or wrapper, reference numeral 2 designates the film, reference numerals 3 and 4 the black sheets, and reference numeral 5 the lead shield.

As shown in FIGS. 1, 2 and 4, the corners of the sheets 3 and 4 and the lead shield 5 are removed, to the lines indicated by reference numeral 6.

The packets, as thus held by the clips at the corners thereof, are then immersed in a light-tight container or receptacle of special construction, and made up of three compartments, one of which contains water, the second a developer solution, and the third a fixing agent. The packets are first immersed in the water compartment, thereby dissolving the polyvinyl alcohol envelope or wrapper, and permitting the black sheets and the lead shield to drop off into this compartment, since these are no longer supported by the envelope or wrapper.

The films are then successively immersed in the developer solution and the fixing agent, the rack being located outside the container, so that it can be manipulated and raised and lowered to immerse the films in the successive solutions and remove them, without undue exposure of the films to light.

In this manner, the films can be properly developed, with a minimum of handling of the components of the packet, and without requiring a dark room for removal of the envelope or wrapper for developing. By developing the films outside of a dark room, the films can be developed a proper length of time, which can rarely be accomplished in the mess and other disadvantages of a dark room. By developing for the correct length of time, the X-ray exposures can be reduced to a minimum, thereby obviating the dangers attendant on excessive radiation.

Referring to FIGS. 5 to 8 inclusive, reference numeral 1a designates the polyvinyl alcohol envelope or wrapper, reference numeral 2a designates the film, reference numerals 3a and 4a the black sheets, and reference numeral 5a the lead shield.

Figures 7, 8:
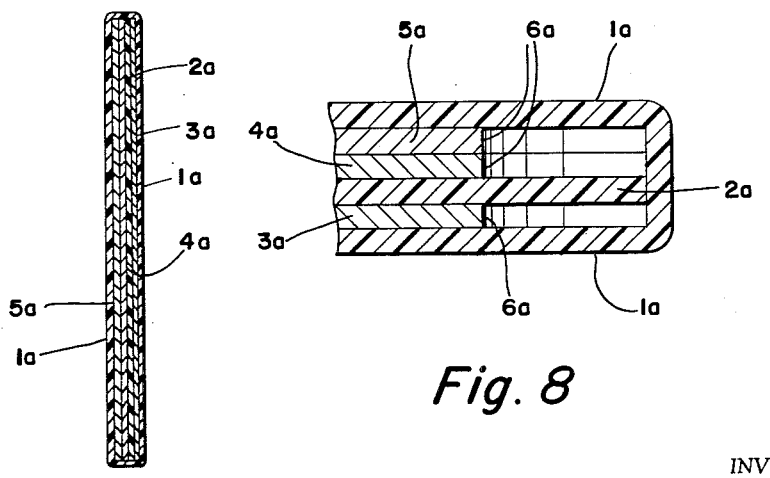
FIG. 7 is a cross-sectional view, on an enlarged scale, taken on the line 7—7 of FIG. 5.
FIG. 8 is a fragmentary cross-sectional view, on an enlarged scale, taken on the line 8—8 of FIG. 5.

As shown in FIGS. 5, 6 and 8, portions or areas of the sheets 3a and 4a and the lead shield 5a along one of the peripheral or marginal edges of the packet are removed, to the lines indicated by reference numeral 6a.

The packets of FIGS. 5 to 8 inclusive, as held by the clips at such peripheral or marginal portions or areas, are first immersed in the water compartment, thereby dissolving the polyvinyl alcohol envelope or wrapper, and permitting the black paper sheets and the lead shield to drop off into this compartment, since these are no longer supported by the envelope or wrapper.

The films are then developed and fixed in the manner already described.

The invention also contemplates the use of a packet of the character described, but in which the use of the black paper sheets is eliminated by using an opaque material or substance as a thin coating for the polyvinyl alcohol envelope or wrapper. As such opaque material, lamp black or a similar material may be used, or, if desired, the lamp black may be mixed with the polyvinyl alcohol to form a homogenous mixture therewith, before the mixture is made up into sheets from which the envelopes or wrappers are made.

Instead of using lamp black as a coating for or as a part of the polyvinyl alcohol envelope or wrapper, an opaque surface for the envelope can be formed by using ammoniacal silver nitrate to precipitate a layer of opaque silver on the inside surface of the envelope by means of paraformaldehyde.

If the envelope or wrapper has sufficient opacity to be effective to prevent light from penetrating the film, the envelope need not be coated with an opaque material. In such case, the use of the black paper sheets may be dispensed with.

Instead of enclosing the film, shield and black paper in an envelope or wrapper which is made of polyvinyl alcohol, other methods of encapsulating the film, shield and black paper may be used. For example, these may be encapsulated by spraying polyvinyl alcohol in a manner to enclose them in the sprayed polyvinyl alcohol, or they may be encapsulated by dipping them in a solution of polyvinyl alcohol.

Instead of using polyvinyl alcohol as the water-soluble envelope or encapsulating medium, some of the soluble hydroxymethyl celluloses, or a water suspension of an acrylic, may be used for this purpose.

It is to be understood that various changes in the packet, in the coatings, and in the manner of applying the coatings or incorporating an opaque material in the envelope, may be made without departing from the spirit of the invention or the scope of the appended claims.

It will also be understood that while the invention has been described particularly with reference to dental X-ray films, that it is applicable to X-ray films generally.

This application is a continuation-in-part of our co-pending application, Serial No. 72,314, filed November 29, 1960, and now abandoned.

Having thus described our invention, we claim:

1. An X-ray film packet comprising a film, a metallic shield for said film, means for preventing fogging of the film by light, and a wrapper of water-soluble material completely enclosing said film, shield and means; said shield and means each having a small marginal portion thereof removed, whereby when the film and wrapper are clamped by a clip at the portion thereof corresponding to the removed portions of the shield and means, and the packet thus clamped is immersed in its entirety in water to thereby dissolve the wrapper, said shield and means will drop into the water, but the film will remain clamped to the clip.

2. An X-ray film packet, as recited in claim 1, in which said wrapper is formed of polyvinyl alcohol.

3. An X-ray film packet, as recited in claim 1, in which said means consists of a sheet of opaque material.

4. An X-ray film packet comprising a film, a metallic shield for said film, and a wrapper of water-soluble material completely enclosing said film and shield, said wrapper having a coating of lamp black for preventing fogging of said film, said shield having a small marginal portion thereof removed, whereby when the film and wrapper are clamped by a clip at the portion thereof corresponding to the removed portion of the shield, and the packet thus clamped is immersed in its entirety in water to thereby dissolve the wrapper, said shield will drop into the water, but the film will remain clamped to the clip.

5. An X-ray film packet, as defined in claim 1, wherein the removed marginal portions of said shield and means are corner portions of said shield and means.

References Cited in the file of this patent

UNITED STATES PATENTS

| | | |
|---|---|---|
| 1,939,213 | Jelley | Dec. 12, 1933 |
| 2,316,595 | Kallman | Apr. 13, 1943 |
| 2,750,027 | Cummings | June 12, 1956 |

OTHER REFERENCES

Keane: X-Ray Paper, from Scientific American, vol. CXXII, No. 23, June 5, 1920, page 623.